US009394995B2

(12) United States Patent
Bahr et al.

(10) Patent No.: US 9,394,995 B2
(45) Date of Patent: Jul. 19, 2016

(54) L-SHAPED SEALING RING

(75) Inventors: Gunther Bahr, Therwil (CH); Frank Voigt, Weil am Rhein (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 112 days.

(21) Appl. No.: 14/239,677

(22) PCT Filed: Aug. 23, 2012

(86) PCT No.: PCT/EP2012/066399
§ 371 (c)(1),
(2), (4) Date: Feb. 19, 2014

(87) PCT Pub. No.: WO2013/026898
PCT Pub. Date: Feb. 28, 2013

(65) Prior Publication Data
US 2014/0202257 A1 Jul. 24, 2014

(30) Foreign Application Priority Data

Aug. 24, 2011 (DE) .......................... 10 2011 081 491

(51) Int. Cl.
*F16J 15/10* (2006.01)
*F16J 15/02* (2006.01)
(Continued)

(52) U.S. Cl.
CPC .............. *F16J 15/022* (2013.01); *F16J 15/062* (2013.01); *F16J 15/106* (2013.01); *G01F 1/58* (2013.01); *G01F 15/185* (2013.01)

(58) Field of Classification Search
CPC ......... F16J 15/022; F16J 15/10; F16J 15/102; F16J 15/104; F16J 15/106
See application file for complete search history.

(56) References Cited

U.S. PATENT DOCUMENTS 4,195,852 A * 4/1980 Roley ................. B62D 55/0887
277/380
4,565,380 A 1/1986 Newman et al.
(Continued)

FOREIGN PATENT DOCUMENTS

CN 1331786 A 1/2002
CN 2641387 Y 9/2004
(Continued)

OTHER PUBLICATIONS

Mar. 6, 2016 English Translation of IPR, WIPO, Geneva, Switzerland.
(Continued)

*Primary Examiner* — Gilbert Lee
(74) *Attorney, Agent, or Firm* — Bacon & Thomas, PLLC

(57) ABSTRACT

An L-shaped sealing ring comprising two legs connected with one another to form an L-shape in cross section. A length of a first leg is part of a lateral surface of revolution about an axis of the L-shaped sealing ring. The first leg lies between the first length and the axis of revolution. A second leg is bounded toward the environment by a second length, wherein the first and second lengths are connected with one another via a connection contour. An intersection of first and second lines, forms a corner of a triangle, wherein the respective end points of the first and second lengths form other vertices of the triangle. The L-shaped sealing ring is so embodied that the surface area of the cross sectional area of the body of the L-shaped sealing ring in the triangle amounts to, at most, 60% of the areal content of the triangle, wherein the area of the L-shaped sealing ring in the triangle is non-concave.

15 Claims, 3 Drawing Sheets

(51) Int. Cl.
*F16J 15/06* (2006.01)
*G01F 1/58* (2006.01)
*G01F 15/18* (2006.01)

(56) References Cited

U.S. PATENT DOCUMENTS

| | | | |
|---|---|---|---|
| 4,688,805 A * | 8/1987 | Crotti | B62D 55/088 277/381 |
| 6,350,075 B1 | 2/2002 | Abels | |
| 6,521,828 B2 | 2/2003 | Ariel | |
| 7,412,901 B2 | 8/2008 | Baecker et al. | |
| 7,415,894 B2 | 8/2008 | Nielsen | |
| 7,810,816 B1 | 10/2010 | Halling | |
| 8,051,722 B2 | 11/2011 | Voigt et al. | |

FOREIGN PATENT DOCUMENTS

| | | |
|---|---|---|
| CN | 201706128 U | 1/2011 |
| DE | 10312824 A1 | 12/2004 |
| DE | 202004012509 U1 | 5/2005 |
| DE | 10358268 A1 | 7/2005 |
| DE | 60206489 T2 | 7/2006 |
| DE | 102005044677 A1 | 3/2007 |
| DE | 102006054635 A1 | 5/2008 |
| DE | 102007040099 A1 | 2/2009 |
| EP | 1640643 A1 | 3/2006 |
| GB | 1314941 | 4/1973 |
| JP | 7280612 | 10/1995 |
| JP | 2005003141 | 1/2005 |
| JP | 2007304040 | 11/2007 |
| WO | 2013026898 A1 | 2/2013 |

OTHER PUBLICATIONS

Jun. 6, 2012 German Search Report, German Patent Office, Munich, Germany.

Dec. 7, 2012 International Search Report, EPO, The Netherlands.

* cited by examiner

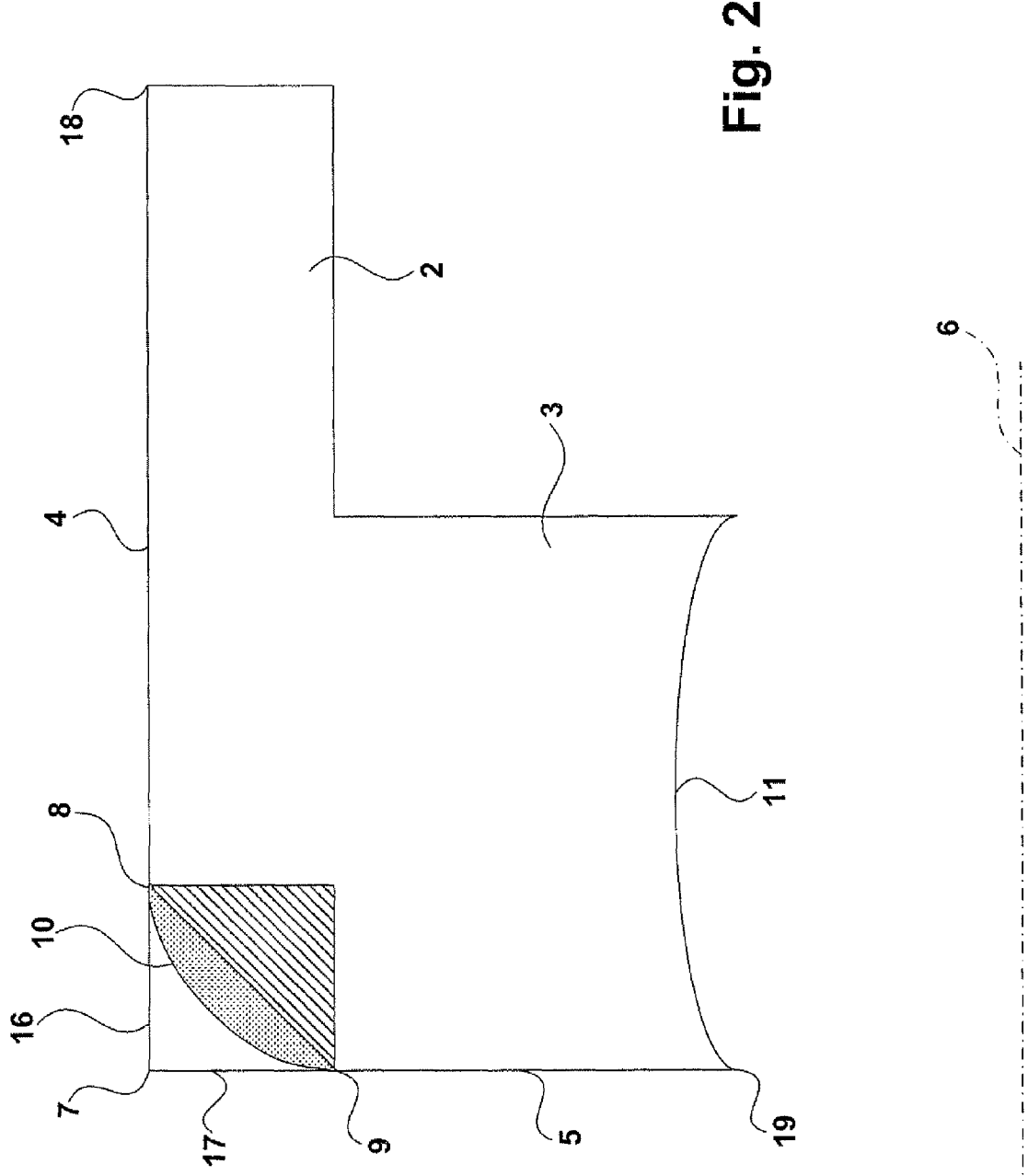

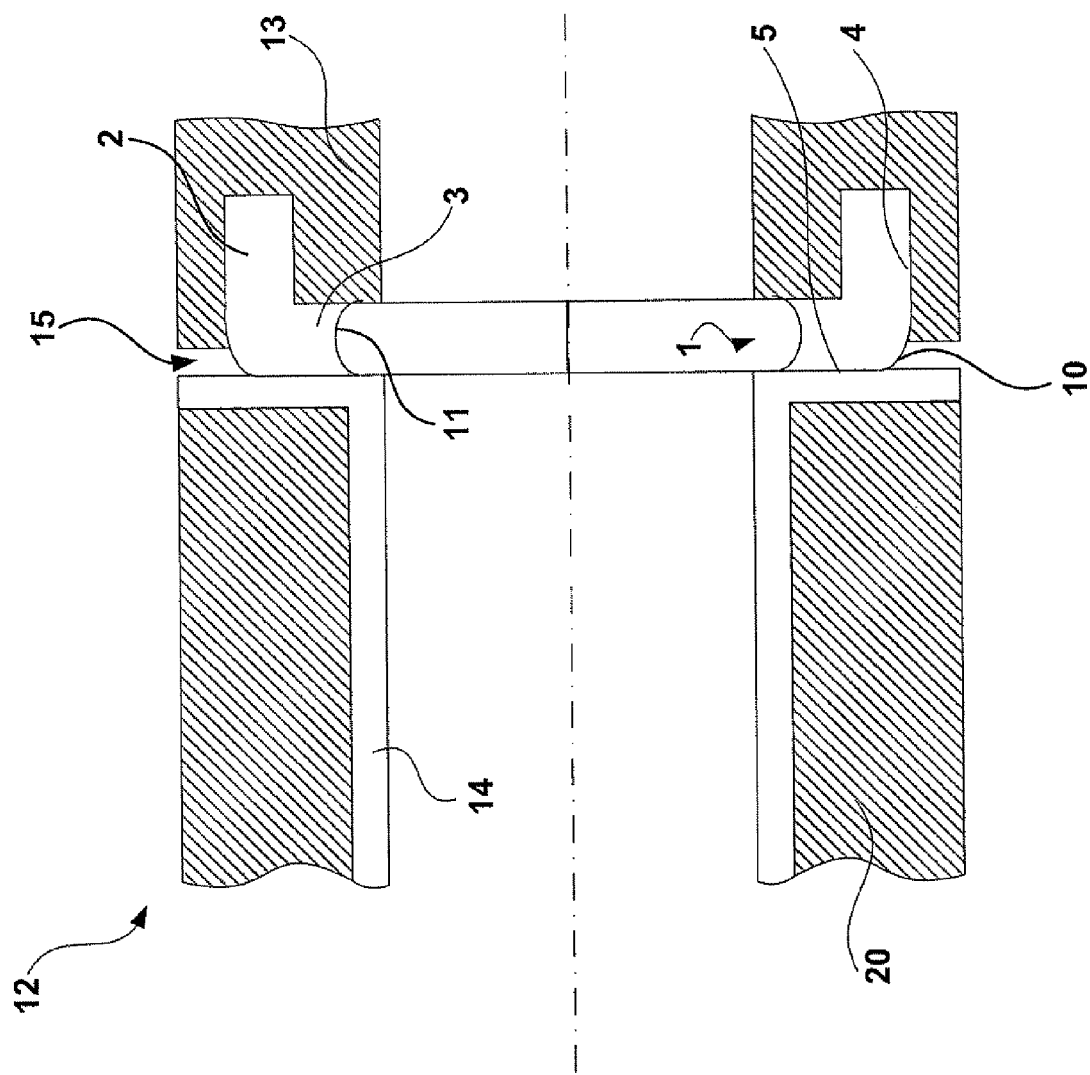

L-SHAPED SEALING RING

TECHNICAL FIELD

The present invention relates to an annular seal having an L-shaped cross section.

BACKGROUND DISCUSSION

L-shaped sealing rings are known to those skilled in the art. Thus, they have been used for years as a sealing element between a magneto inductive flow measuring device and a separate process connection, e.g. by the firm, Endress+Hauser, in the products, Promag H and Dosimag, as well as also by the firm, Krohne, in its Optiflux 6000 product.

The known sealing rings can in the installed state in the case of an expansion, e.g. because of temperature increase, expand essentially perpendicularly at two surfaces. On the one hand, they expand perpendicularly at the medium-contacting area whose cross section is shown in FIG. 2 as line 11, on the other hand, perpendicularly at the area, which is represented in the cross section in FIG. 2 by the line perpendicular to line 4 through point 18. The expansion in the region of line 11 can lead to an undesired change of the cleanability or of the pressure loss of the flow meter 12 in FIG. 3. Furthermore, it can lead in the case of strong and frequent temperature fluctuations through repeated expansion and contraction of the seal across the edge of the lining 14 or of the process connection 13 in FIG. 3 to a damaging of the seal with concurrent limiting of the sealing action or of the hygienic properties. Shorter service times of the seals can be the result.

Japanese Patent, JP 2005 003 141 A discloses in FIG. 3 an L-shaped ring, which abuts as a spacer on a W-shaped sealing element in such a manner that a leg of the W-shaped sealing element is arranged between the area to be sealed and the L-shaped ring. Therefore, the L-shaped ring of FIG. 3 does not act as a sealing ring.

U.S. Pat. No. 4,565,380 A discloses a number of sealing ring variants. Thus e.g. FIGS. 20-22A show an S-shaped sealing ring. However, there are no L-shaped sealing rings. German Patent, DE 103 12 824 A1 discloses an O-shaped seal, wherein the sealing action, however, in the case of the exerting of a compression, is directed from the outside inwards, i.e. the material of the sealing ring is pressed toward the center.

SUMMARY OF THE INVENTION

An object of the invention is to provide an L-shaped sealing ring, which, in the case of expansion, e.g. due to temperature increase, effects a reduction of the change of the medium-contacting profile.

The object is achieved by an L-shaped sealing ring which includes two legs connected with one another to form an L-shape in the cross section through the body of the L-shaped sealing ring, wherein a first leg is bounded toward the environment by a first length, wherein the first length is part of a lateral surface of revolution about an axis of the L-shaped sealing ring, wherein the first leg lies between the first length and the axis, and wherein a second leg is bounded toward the environment by a second length, wherein the first and second lengths are connected with one another via a connection contour, and wherein an intersection of first and second lines, which form, respectively, extensions of the first and second lengths, forms a corner of a triangle, wherein the respective end points of the first and second lengths form other vertices of the triangle, wherein the L-shaped sealing ring is so embodied that the surface area of the cross sectional area of the body of the L-shaped sealing ring in the triangle amounts to, at most, 60% of the areal content of the triangle, and wherein the area of the L-shaped sealing ring in the triangle is non-concave, especially it is convex.

Under action of a vertical force, thus a force in the direction of the axis of revolution, the sealing ring exerts a sealing action from the inside outwards, thus from the leg toward the triangle. Through the special structure of the L-shaped sealing ring, the inner region of the sealing ring facing the axis of revolution is moved, e.g. in the case of compression, in lesser measure toward the tube center, which e.g. in the case of a flow measurement can avoid the occurrence of disturbing perturbations of the flow.

It is advantageous when the L-shaped sealing ring is so embodied that the first and second lines, which form, respectively, extensions of the first and second lengths, intersect in the installed state perpendicularly at the intersection, in order to form a corner of a rectangle, wherein the respective end points of the first and second lengths form other vertices of the rectangle, wherein the L-shaped sealing ring is so embodied that the surface area of the cross sectional area of the body of the L-shaped sealing ring in the rectangle is at least 1% less than the surface area of the rectangle, and wherein the area of the L-shaped sealing ring in the rectangle is non-concave, especially it is convex.

It is additionally advantageous when a first arc as connection contour connects the first and second lengths with one another.

This first arc has advantageously a radius of at least 2% of the length of the endpoint of the first length of the first leg of the L-shaped sealing ring from the axis of revolution (6) of the L-shaped sealing ring (1).

A yet better preventing of movement of the part of the second leg of the seal facing the axis of revolution in the direction of the axis of revolution due to compression or also, for example, due to thermal expansion of the seal material in the case of increase of the process temperature is achieved by way of a non-convex curvature of the region of the second leg of the L-shaped sealing ring facing toward the axis of revolution of the L-shaped sealing ring.

A preferred material for the L-shaped sealing ring is a polymer, especially an EPDM or, for example, also a FKM or VMQ.

In general, it is advantageous to maximize the sealing action at the leg end, so that the seal assures, in the case of compression, an especially good sealing action in this region.

The L-shaped sealing ring can in the case of action of an external force or e.g. in the case of thermal expansion react preferably by material escape toward the triangle with increasing of the areal content of the cross sectional area of the body of the L-shaped sealing ring in the triangle. Thus, the intersection region of the two legs is pressed outwards, for example, into the corner of a cavity existing between the boundary of the installation space and the sealing ring.

The angle between the two legs of the L in the uncompressed state amounts to preferably between 75-115°, especially between 80-110°. This effects a stronger compression at the end of the first leg and, thus, a maximum sealing directly at the contact location with the medium. At the same time, the side of the second leg facing the axis of revolution can also be moved in the case of manufacturing tolerances as little as possible with compression. In the case of a greater starting volume of the seal compared with the minimum volume, the inventive shaping of the arc between the first and second lengths of the seal can provide an expansion space at the side of the second leg facing away from the maximum sealing.

The invention includes an apparatus having a magneto inductive flow measuring device and a process connection, as well as an L-shaped sealing ring and applied, respectively arranged, between a magneto inductive flow measuring device and a process connection.

An embodiment provides that the first length of the L-shaped sealing ring forms a sealing surface with the process connection and the second length of the L-shaped sealing ring forms a sealing surface with a measuring tube lining of the magneto inductive flow measuring device.

In an additional embodiment, there is provided between magneto inductive flow measuring device and process connection adapter, a gap of the state of the art, through which fluid can escape in the case of failure of the L-shaped sealing ring, wherein the connection contour between the first and second lengths is arranged before the gap. In this way, a directed bringing away of the fluid in the case of failure of the sealing ring is advantageously enabled.

In order to enable an improved centering and mechanical stability of the seal, at least one leg in a leg region, which faces away from the triangle, is arranged in a cavity of the process connection, wherein the leg, respectively leg region, bears against the process connection on all sides in this cavity. In order, on the other hand, also here to provide an additional expansion space, an advantageous embodiment provides that the region of the first leg facing away from the triangle does not lie completely against the process connection. However, there are sufficiently many points of contact, in order to assure sufficient support and centering.

According to the invention, an L-shaped sealing ring is applied between the measuring device or the retractable assembly and a process connection and thereby enables movement of a fluid from the process connection into the measuring tube with reduced perturbation from the seal.

BRIEF DESCRIPTION OF THE DRAWINGS

The invention permits numerous forms of embodiment. Some thereof will now be explained in greater detail based on the figures of the appended drawing. Equal elements are provided in the figures with equal reference characters. The figures of the drawing show as follows:

FIG. 2 half of a cross section through the body of an L-shaped sealing ring of the invention, wherein the cutting plane for the cross section contains the axis of revolution 6 of FIG. 1; and FIG. 3 in complete cross section again containing the axis of revolution 6, an L-shaped sealing ring of the invention assembled according to the invention between a magneto inductive flow measuring device and a separate, process connection.

DETAILED DISCUSSION IN CONJUNCTION WITH THE DRAWINGS

Figure 1:
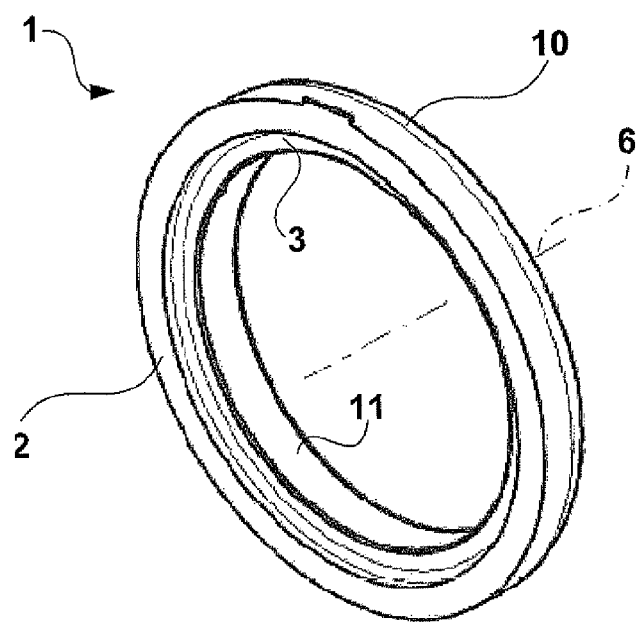
FIG. 1 perspectively, an L-shaped sealing ring of the invention.

FIG. 1 shows, perspectively, an L-shaped sealing ring 1 of the invention. FIG. 2 shows that the cross section has an L-shape and, thus, is composed of two legs 2 and 3 connected with one another at an apex. An L-shaped sealing ring is a closed, circularly shaped sealing ring, comparable with an O-ring, however, exhibiting an L-shape in its cross section half, instead of an O-shape as in the case of an O-ring. The legs are separated in the unassembled state of the L-shaped sealing ring in an embodiment of the invention by an angle greater than or equal to 90°.

The first leg 2 has according to the invention, such as made clear in FIG. 2 in the cross section through the body of the L-shaped sealing ring 1, a first length 4 as outer contour bounding the first leg 2 toward the environment. Equally, the second leg 3 has in the cross section through the body of the L-shaped sealing ring 1 a second length 5 as outer contour, by which the second leg 3 is bounded toward the environment.

The L-shaped sealing ring is so formed in such case that the first length 4 is part of an outer lateral surface of revolution about the axis 6 of the L-shaped sealing ring 1, wherein the first leg 2 lies between the first length 4 and the axis of revolution 6. The first length 4 and the second length 5 are connected indirectly with one another via a connection contour. Thus, they are cut short such that they do not intersect. The connection contour thus has a length greater than zero, in contrast with the state of the art. In this example of an embodiment, the connection contour is formed by an arc 10 of a first radius for connecting the first and second lengths with one another. Another option would be to provide a third length between the first and second lengths 4 and 5, in which case the L-shaped sealing ring 1 would have a chamfer instead of the arc 10. In an embodiment of the invention, the connecting line 10 between the points 8 and 9 is any non-convex line, which contacts the triangle formed by the points 7, 8 and 9 only in the points 8 and 9.

The arc 10 is located in the apex of the first and second legs 2 and 3. It has, further developed, a radius of at least 2%, especially at least 5%, especially at least 10%, especially at least 20%, of the length of the first endpoint 8 of the first length 4 of the first leg 2 of the L-shaped sealing ring 1 from the axis of revolution 6 of the L-shaped sealing ring 1. The doubled value of this length corresponds here to the value of the outer diameter of the L-shaped sealing ring 1.

FIG. 2 shows the L-shaped sealing ring 1 in section. According to the invention, the L-shaped sealing ring 1 is so embodied that an imaginary intersection 7 of first and second lines 16 and 17, which represent, respectively, extensions of the first and second lengths 4 and 5, forms a corner of an imaginary triangle, wherein the respective first end points 8 and 9 of the first and second lengths 4 and 5 form the other vertices of the triangle, wherein the L-shaped sealing ring 1, especially the connection contour of the L-shaped sealing ring 1, is so embodied that the surface area of the cross sectional area of the body of the L-shaped sealing ring 1 in the triangle amounts to, at most, 60%, especially, at most, 20%, especially, at most, 10%, especially, at most, 1%, of the areal content of the virtual triangle, wherein the area of the L-shaped sealing ring in the triangle is non-concave, especially it is convex. The cross sectional area of the body of the L-shaped sealing ring 1 in the triangle is indicated here in the drawing by the dotted area.

The surface area of the cross sectional area of the body of the L-shaped sealing ring 1 in the triangle can be 0% of the areal content of the triangle, namely then, when the direct connecting line between the first end points 8 and 9 of the two lengths 4 and 5 limits the section through the L-shaped sealing ring 1. In such case, the area in the triangle is also non-concave, since the area in the triangle, under the assumption that the connecting line belongs to the triangle, is composed only of a line, which is, of course, non-concave. Then, we are dealing with a chamfered, L-shaped sealing ring, instead of the shown L-shaped sealing ring with the arc having a radius.

In comparison with a conventional L-shaped sealing ring, in the case of which the first and second lengths 4 and 5 intersect in the cross section through the body of the L-shaped sealing ring with a predetermined angle, e.g. 90°, there is in the region of the apex of the two L-shape connected legs a volume reduction present, which leads to smaller expansion of the seal in the case of temperature increase or swelling. Moreover, the seal has in this region a greater space into which to expand. This leads to the feature that the contour 11 of the seal is influenced less by the expansion of the seal relative to the process connection 13 and to the lining 14.

In an embodiment of the invention, such as illustrated here, the first length 4 is formed by the cross section through the body of the L-shaped sealing ring 1 cutting through a first lateral surface of the first leg 2, a first lateral surface that is circularly cylindrical about an axis 6 of the L-shaped sealing ring 1. The first leg 2 is thus bounded by a first, circularly cylindrical, lateral surface of revolution around the axis of the L-shaped sealing ring and, for example, by a second, especially circularly cylindrical, lateral surface of revolution around the axis of the L-shaped sealing ring. The second leg 3 includes, especially lying in a plane perpendicular to the axis 6 of revolution, a sealing surface, which, in the section through the L-shaped sealing ring containing the axis 6, appears as second length 5.

In an additional further development, the L-shaped sealing ring 1 is so embodied that the first and second lines 16 and 17, which represent respective extensions of the first and second lengths 4 and 5, intersect perpendicularly in the imaginary, virtual intersection 7, which forms a corner of a virtual diamond, especially a here illustrated, imaginary rectangle, wherein the respective first end points 8 and 9 of the first and second lengths 4 and 5 form other vertices of the diamond, respectively the rectangle. The lengths 16 and form, thus, two edges of the diamond, respectively of the rectangle. The fourth corner of the diamond, respectively of the rectangle, is formed by the intersection of a line perpendicular to the line 4 through point 8 in the cutting plane and a line perpendicular to the line 5 in the cutting plane through point 9. The L-shaped sealing ring 1, especially the connection contour of the L-shaped sealing ring 1, is, in such case, so embodied that the surface area of the cross sectional area of the body of the L-shaped sealing ring in the diamond, respectively here in the rectangle, is around 1%, especially 10%, especially 20%, especially 50%, less than the surface area of the diamond, respectively of the rectangle, wherein the area of the cross section through the body of the L-shaped sealing ring 1 in the diamond, respectively in the rectangle, is non-convex, especially it is convex. The cross sectional area of the body of the L-shaped sealing ring 1 in the rectangle is presented here cross-hatched and dotted, or stippled.

The surface area of the diamond is thus fixed at 100%. If the surface area of the cross section of the seal in the diamond is 21% less, then it amounts, thus, to 79% of the areal content of the diamond. A rectangle is a diamond with four right angles. This means that the first and second lengths 16 and 17 are perpendicular to one another.

In the illustrated further development of the L-shaped sealing ring of the invention 1, such includes a second arc 11 in the region of the second leg 3 of the L-shaped sealing ring 1 facing the axis of revolution 6 of the L-shaped sealing ring 1. This region is concavely curved. In a further development of the invention, this region of the second leg 3 of the L-shaped sealing ring 1 facing toward the axis of revolution 6 of the L-shaped sealing ring 1 is bounded in the cross section by the non-convex, curved line of second arc 11.

The second arc 11 has, in such case, a radius of at least 5%, especially at least 10%, especially at least 50%, especially at least 100%, especially at least 200%, of the separation of a second endpoint 19 of the second length 5 of the second leg 3 of the L-shaped sealing ring from the axis of revolution 6 of the L-shaped sealing ring 1. The doubled separation of the second endpoint 19 from the axis of revolution 6 establishes, in such case, the inner diameter of the L-shaped sealing ring.

An L-shaped seal of the invention is applied, for example, in industrial process technology, especially between a magneto inductive flow measuring device and a process connection. Such an apparatus with a magneto inductive flow measuring device 12, a process connection 13 and an L-shaped sealing ring 1 of the invention is illustrated in FIG. 3, wherein the L-shaped sealing ring 1 of the invention is applied for sealing between the magneto inductive flow measuring device 12 and the process connection 13.

The section through the apparatus of the invention in FIG. 3 contains the axis of revolution. Equally, the cross sectional plane through the body for FIG. 2 contains the axis of revolution 6. Involved, thus, is the same cutting plane.

In such case, the first length 4 of the L-shaped sealing ring 1 contacts the process connection 13. In this way, the seal 3 is centered in the process connection 13. The second length 5 of the L-shaped sealing ring 1 in the cross section forms a sealing surface with a liner 14 of a measuring tube 20 of the magneto inductive flow measuring device 12.

In the illustrated further development, there is, in such case, between the magneto inductive flow measuring device 12 and the process connection 13 an annular gap 15, through which fluid can escape in the case of failure of the L-shaped sealing ring 1, wherein the connection contour, here the first arc 10, between first and second lengths 4 and 5 is arranged in the gap 15. Also the second arc 11 is shown, which assures, in the case of an axial shortening of the second leg parallel to the axis of revolution 6, that no gaps are formed relative to the liner 14 or the process connection 13, since such would violate hygiene specifications. Expansion of the second leg 3 is especially minimized by the inventive shaping of the connection contour between the end points 8 and 9 and the positions (separation of point 18, respectively 19) of the end points 8 and 9 of the lengths 4 and 5 with the goal of volume reduction. A volume reduction, in this way, has, compared with a less thick shaping of the leg 3, the advantage that the absolute desired compression (expressed in the dimension, length) compared with the non-volume reduced shaping of the seal need not be reduced, and, thus, tolerance accommodation is maintained. Compared with a less thick shaping of the leg 2, the volume reduction of the invention has the advantage that the position of the centering surface 4 is compatible with already installed process connections 13.

The process connection 13 can be an adapter for a predetermined process connection, for example, also a welded nozzle. It could, thus, also be called a process connection adapter. Besides the annular gap 15, a so called air escape groove can be provided in the process connection 13. This extends e.g. in a plane perpendicular to the axis of revolution of the assembled L-shaped sealing ring parallel to a diameter of the L-shaped sealing ring. The air escape groove is likewise intended for conducting fluid outwardly.

In a further development of the invention, the L-shaped sealing ring 1 comprises an elastomer, especially EPDM, VMQ, FKM, or FFKM.

The sealing surface pairs are formed, for example, on the side facing the flow measuring device 12 (line 5 in FIG. 2) by the L-shaped sealing ring of one of the above-mentioned elastomers and a measuring tube lining 14 of synthetic material, especially PFA, and on the other side facing the process connection 13 by the L-shaped sealing ring and a process connection 13 of metal, especially stainless steel, especially 1.4404.

The examples of embodiments illustrated in FIGS. 1-3 exhibit preferred variants of a sealing ring of the invention.

The sealing ring can, of course, be developed further based on the technical knowledge of those skilled in the art, for example, by forming further escape spaces in the region of the legs of the L-shaped sealing ring.

The invention claimed is:

1. An apparatus L shaped sealing ring, comprising:
a magneto inductive flow measuring device; and
a process connection, wherein:
an L-shaped sealing ring is applied between said magneto inductive flow measuring device and said process connection;
the L-shaped sealing ring, comprising:
two legs connected with one another to form an L-shape in cross section through the body of the L-shaped sealing ring, wherein:
a first leg is bounded toward the environment by a first length;
said first length is part of a lateral surface of revolution about an axis of the L-shaped sealing ring;
said first leg lies between said first length and said axis;
a second leg is bounded toward the environment by a second length; said first and second lengths are connected with one another via a connection contour;
an intersection of first and second lines, which form, respectively, extensions of said first and second lengths, forms a corner of a triangle;
the respective end points of said first and second lengths form other vertices of the triangle;
the L-shaped sealing ring is so embodied that the surface area of the cross sectional area of the body of the L-shaped sealing ring in the triangle amounts to, at most, 60% of the areal content of the triangle; and
the area of the L-shaped sealing ring in the triangle is non-concave, especially it is convex.

2. The apparatus as claimed in claim 1, wherein:
the L-shaped sealing ring is so embodied that said first and second lines, which form, respectively, extensions of said first and second lengths, intersect in the installed state perpendicularly at said intersection, in order to form a corner of a rectangle;
said respective end points of said first and second lengths form other vertices of the rectangle;
the L-shaped sealing ring is so embodied that the surface area of the cross sectional area of the body of the L-shaped sealing ring in the rectangle is at least 1% less than the surface area of the rectangle; and
the area of the L-shaped sealing ring in the rectangle is non-concave, especially it is convex.

3. The apparatus as claimed in claim 1; wherein:
a first arc as a connection contour connects said first and second lengths with one another.

4. The apparatus as claimed in claim 3, wherein:
said first arc has a radius of at least 2% of the length of said endpoint of said first length of said first leg of the L-shaped sealing ring from said axis of revolution of the L-shaped sealing ring.

5. The apparatus as claimed in claim 1, wherein:
a region of said second leg of the L-shaped sealing ring facing said axis of revolution of the L-shaped sealing ring is curved non-convexly.

6. The apparatus as claimed in claim 1, wherein:
the L-shaped sealing ring comprises a polymer.

7. The apparatus as claimed in claim 1, wherein:
the L-shaped sealing ring is embodied in such a manner that it reacts under action of process related expansion, especially thermal expansion, with an escape movement toward the triangle.

8. The apparatus as claimed in claim 1, wherein:
the L-shaped sealing ring in the installed state in interaction with an outer abutment of a unit to be sealed forms an escape space;
the L sealing ring in the case of use of the escape space, especially by performing an escape movement, increases the surface area of the cross sectional area of the body of the L-shaped sealing ring in the triangle.

9. The apparatus as claimed in claim 1, wherein:
the angle between said first and said second legs of the L-shape in the non-installed state amounts to between 75-115°.

10. The apparatus as claimed in claim 1, wherein:
said first length of said L-shaped sealing ring contacts said process connection; and
said second length of said L-shaped sealing ring forms a sealing surface with a liner of said magneto inductive flow measuring device.

11. The apparatus as claimed in claim 1, wherein:
between said magneto inductive flow measuring device and said process connection adapter, a gap is formed, through which fluid can escape in the case of failure of the L-shaped sealing ring; and
said connection contour between said first and second lengths is arranged before said gap.

12. The apparatus as claimed in claim 1, wherein:
at least a first leg is arranged above the triangle in a cavity of said process connection; and
the first leg bears against said process connection on all sides in this cavity.

13. The L-shaped sealing ring as claimed in claim 1, wherein:
the L-shaped sealing ring comprises an EPDM.

14. The L-shaped sealing ring as claimed in claim 1, wherein:
the angle between said first and said second legs of the L-shape in the non-installed state amounts to between 80-110°.

15. An apparatus, comprising:
a measuring device or a retractable assembly;
a process connection; and
an L-shaped sealing ring applied between the measuring device or the retractable assembly and a process connection, said L-shaped sealing ring, comprising: two legs connected with one another to form an L-shape in cross section through the body of the L-shaped sealing ring, wherein: a first leg is bounded toward the environment by a first length; said first length is part of a lateral surface of revolution about an axis of the L-shaped sealing ring; said first leg lies between said first length and said axis; a second leg is bounded toward the environment by a second length; said first and second lengths are connected with one another via a connection contour; an intersection of first and second lines, which form, respectively, extensions of said first and second lengths, forms a corner of a triangle; the respective end points of said first and second lengths form other vertices of the triangle; the L-shaped sealing ring is so embodied that the surface area of the cross sectional area of the body of the L-shaped sealing ring in the triangle amounts to, at most, 60% of the areal content of the triangle; and the area of the L-shaped sealing ring in the triangle is non-concave, especially it is convex.

* * * * *